(12) United States Patent
Skaare

(10) Patent No.: US 12,129,825 B2
(45) Date of Patent: Oct. 29, 2024

(54) WIND TURBINE CONTROL

(71) Applicant: EQUINOR ENERGY AS, Stavanager (NO)

(72) Inventor: Bjørn Skaare, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 17/757,166

(22) PCT Filed: Dec. 21, 2020

(86) PCT No.: PCT/NO2020/000006
§ 371 (c)(1),
(2) Date: Jun. 10, 2022

(87) PCT Pub. No.: WO2021/125966
PCT Pub. Date: Jun. 24, 2021

(65) Prior Publication Data
US 2023/0054921 A1    Feb. 23, 2023

(30) Foreign Application Priority Data

Dec. 20, 2019 (GB) ...................... 1919010

(51) Int. Cl.
*F03D 13/25*     (2016.01)
*B63B 35/44*     (2006.01)
*F03D 7/02*      (2006.01)

(52) U.S. Cl.
CPC ............. *F03D 13/25* (2016.05); *B63B 35/44* (2013.01); *F03D 7/0224* (2013.01); *F03D 7/0276* (2013.01); *B63B 2035/446* (2013.01)

(58) Field of Classification Search
CPC ....... F03D 7/0224; F03D 7/0276; F03D 13/25
See application file for complete search history.

(56) References Cited

U.S. PATENT DOCUMENTS

| | | | | |
|---|---|---|---|---|
| 8,044,529 B2* | 10/2011 | Egedal | ................. | F03D 7/0276 |
| | | | | 290/55 |
| 8,487,464 B2* | 7/2013 | Skaare | ................. | F03D 7/0296 |
| | | | | 290/44 |
| 10,619,623 B2* | 4/2020 | Caponetti | ............... | F03D 7/024 |
| 11,204,018 B2* | 12/2021 | Nielsen | .................. | B63B 39/03 |
| 11,396,862 B2* | 7/2022 | Caponetti | ............. | F03D 7/0224 |

(Continued)

FOREIGN PATENT DOCUMENTS

| | | |
|---|---|---|
| CN | 103541861 A | 1/2014 |
| CN | 110446853 A | 11/2019 |

(Continued)

OTHER PUBLICATIONS

STIC Translation of JP2014111924A (Year: 2014).*

(Continued)

*Primary Examiner* — Tulsidas C Patel
*Assistant Examiner* — Thomas K Quigley
(74) *Attorney, Agent, or Firm* — Eversheds Sutherland (US) LLP

(57) ABSTRACT

A controller is provided for a floating wind turbine including a rotor with a number of rotor blades connected to a generator. The controller includes an active damping controller for calculating one or more outputs for damping both a first motion of the floating wind turbine in a first frequency range and a second motion of the floating wind turbine in a second frequency range based on an input of the first motion and an input of the second motion, The controller is arranged to calculate an output for controlling a blade pitch of one or more of the rotor blades and/or for controlling a torque of the generator based on an actual rotor speed, a target rotor speed, and the one or more outputs from the active damping controller such that both the first motion and the second motion will be damped.

20 Claims, 8 Drawing Sheets

(56) References Cited

U.S. PATENT DOCUMENTS

| | | | |
|---|---|---|---|
| 11,732,692 B2* | 8/2023 | Egedal | F03D 7/0232 |
| | | | 290/44 |
| 2010/0003134 A1* | 1/2010 | Edwards | F03D 13/25 |
| | | | 416/37 |
| 2011/0204636 A1* | 8/2011 | Scholte-Wassink | H02P 9/008 |
| | | | 290/44 |
| 2011/0316277 A1* | 12/2011 | Skaare | F03D 7/043 |
| | | | 290/44 |
| 2012/0098265 A1* | 4/2012 | Skaare | B63B 39/062 |
| | | | 290/53 |
| 2015/0003984 A1 | 1/2015 | Pineda Amo | |
| 2015/0354532 A1* | 12/2015 | Nielsen | F03D 7/0224 |
| | | | 416/85 |
| 2016/0377057 A1* | 12/2016 | Caponetti | F03D 9/25 |
| | | | 416/1 |
| 2016/0377058 A1* | 12/2016 | Caponetti | F03D 7/0224 |
| | | | 416/1 |
| 2019/0277255 A1* | 9/2019 | Nielsen | F03D 7/0292 |

FOREIGN PATENT DOCUMENTS

| | | |
|---|---|---|
| CN | 115467778 A | 12/2022 |
| DK | 201470481 A1 | 8/2015 |
| EP | 2063110 A1 | 5/2009 |
| EP | 2489872 A1 | 8/2012 |
| EP | 2620639 A1 | 7/2013 |
| EP | 3020960 A1 | 5/2016 |
| JP | 2014/111924 A | 6/2014 |
| JP | 2014231785 A | 12/2014 |
| JP | 2017053275 A | 3/2017 |
| WO | 2010076557 A2 | 7/2010 |
| WO | 2010122316 A1 | 10/2010 |
| WO | 2013065323 A1 | 5/2013 |
| WO | 2014096419 A1 | 6/2014 |
| WO | 2018101833 A1 | 6/2018 |

OTHER PUBLICATIONS

International Search Report and Written Opinion for PCT/NO2020/000006, dated Mar. 3, 2021 (9 pp.).
Search Report, GB1919010.7, dated May 20, 2020 (4 pp.).
Office Action, JP 2022-537286 (with English translation), dated May 9, 2023 (7 pp.).
Office Action, CN 202080096894.2, dated May 23, 2023 (6 pp.).
Extended EP Search Report for EP 20902394.4, dated Jan. 30, 2024 (30 pp.).

* cited by examiner

WIND TURBINE CONTROL

TECHNICAL FIELD

The present invention relates to a controller for a floating wind turbine and a method of controlling the blade pitch and/or generator torque of a floating wind turbine. This may be for controlling motions of the floating wind turbine.

BACKGROUND OF THE INVENTION

A wind turbine installation is usually formed of a support structure comprising an elongate tower, with a nacelle and a rotor attached to the upper end of the support structure. The generator and its associated electronics are usually located in the nacelle.

A wind turbine installation may be a fixed-base wind turbine that is fixed either to the land or the sea bed or a floating wind turbine. One example floating wind turbine comprises a conventional wind turbine structure mounted on a buoyant base such as a platform or raft-like structure. Another example is a "spar buoy" type structure. Such a structure is formed of an elongate buoyant support structure with a rotor mounted on the top. The support structure could be a unitary structure or it could be an elongate sub-structure with a standard tower mounted thereon.

Floating wind turbine installations may be moored to the sea bed via one or more mooring lines with anchors or attached to the sea bed with one or more articulated (hinged) legs, for example, in order to hold them at their desired installation sites.

Fixed foundation wind turbines are rigidly secured to a landmass at one end. When acted on by forces, such as those caused by changes in wind speed or direction, a fixed foundation wind turbine acts as a cantilever and the tower vibrates as it bends. These motions may have small amplitudes but high frequencies, i.e. they can be small, fast motions. In contrast, floating wind turbines are not rigidly secured to a land mass and as a result the whole elongate structure can move in a rigid body manner in addition to the same types of tower vibrations as those experienced by fixed foundation turbines.

When a floating wind turbine is acted on by forces, such as those caused by changes in wind speed or direction or those caused by waves, the whole structure may move about in the water. These motions may have large amplitudes but relatively low frequencies, i.e. they can be large, slow motions. The motions are low frequency in the sense that they are much lower than the rotational frequency of the turbine/rotor itself. These are rigid body motions (rather than bending motions). The motions experienced are "heave" which is a linear vertical (up/down) motion (e.g. in a vertical direction perpendicular to the rotor axis), "sway" which is a linear lateral (side-to-side) motion (e.g. in a horizontal direction perpendicular to the rotor axis), "surge" which is a linear longitudinal (front/back) motion (e.g. in a direction parallel to the rotor axis), "roll" which is a rotation of the body about its horizontal (front/back) axis (e.g. about the rotor axis), "pitch" which is a rotation of the body about its transverse (side-to-side) axis (e.g. about a horizontal axis that is perpendicular to the rotor axis), and "yaw" which is a rotation of the body about its vertical axis (e.g. about a vertical axis that is perpendicular to the rotor axis).

In certain circumstances, these motions can reduce the overall efficiency or power output of the turbine and, moreover, can create excessive structural stresses which can damage or weaken the wind turbine structure and/or associated mooring or could cause instability in the motions of the floating wind turbines. There is therefore a desire to control these rigid body motions.

In conventional wind turbines, the pitch of the rotor blades is controlled in order to regulate the power output. The power output generated by the turbine is maximised at a particular wind speed, known as the rated wind speed. When operating in winds below the rated wind speed, the blade pitch is kept approximately constant at an angle that provides maximum power output. In contrast, when operating above the rated wind speed, the blade pitch is adjusted in order to produce a constant power output and prevent excessively high power outputs that could damage the generator and/or its associated electronics. This constant power output may be referred to as the rated power of the wind turbine. In this regime the rotor may be controlled so that it rotates at a constant speed. This may be referred to as a desired and/or target rotor speed.

The wind turbine may also have a cut-out wind speed, which is a wind speed at which the turbine shuts down to avoid damage.

When operating below the rated wind speed, as the blade pitch is kept approximately constant, the thrust acting on the rotor increases with the wind speed. Thrust is approximately proportional to the square of the wind speed relative to the rotor. As a result, axial motions, which increase the relative wind speed, may be damped. If the wind speed increases above the rated wind speed, then the blade pitch may be increased (which means to make the blade pitch more parallel to the wind direction) to reduce the thrust.

Using the pitch control described above for constant power output, in response to an increase in the rotor torque or speed, the blade pitch angle is adjusted to reduce the torque acting on the rotor to reduce the thrust and thereby maintain a constant power output. However, as the thrust is reduced, the damping force acting on the wind turbine's motions is also reduced and can become negative. In other words, the motions can be exacerbated and their amplitude increases. This then may result in a further change in the relative wind speed and a further adjustment to the blade pitch, making the motions even larger. The opposite applies when the wind turbine is moving away from the wind, resulting in a further exacerbation of the motions. This is known as negative damping.

For example, negative damping in fixed-base wind turbines arises because the turbine may vibrate forwards and backwards due to excitations of the tower's natural bending vibrations. As the wind turbine moves towards the wind, the relative wind speed acting on the wind turbine increases, which tends to increase the rotor torque or speed. Then, use of the pitch control as described above may lead to negative damping of these vibrations.

The problem of negative damping is illustrated in FIG. 1, which shows the thrust force as a function of wind speed for a 2.3 MW turbine using the standard blade pitch control described above. The thrust force for wind speeds above 12 $ms^{-1}$ (which may be the rated wind speed) decreases with increasing wind speed due to adjustment of the blade pitch, and consequently negative damping may be introduced into the system in this wind speed range.

In fixed-base wind turbines, negative damping can be prevented or minimised by reducing the bandwidth of the blade pitch controller to lie below the natural frequency of the first order bending mode of the tower. In other words, the controller does not adjust the blade pitch for tower motions with frequencies above the natural frequency of the first order bending mode of the tower.

However, a floating wind turbine also has other modes of oscillation, besides the bending modes, which makes the problem of dealing with negative damping in floating wind turbines much more complex. Moreover, the prior art system discussed above does not deal with the most significant modes of oscillation in a floating wind turbine installation.

FIG. 2 shows power spectrum for the oscillations of different wind turbine installations. The scale on the vertical axis is proportional to the amplitude of the oscillations, which is proportional to the square root of the power of the oscillations. The scale on the horizontal axis is the frequency of the oscillations in Hz. It can be seen that the power spectrum has four main peaks. Only the fourth peak (first tower bending mode) is also present in the power spectrum for a fixed-base wind turbine. The third peak from the left (wave induced motion) may be seen in floating wind turbines and fixed offshore wind turbines, though the first two peaks (natural period in surge and natural period in pitch) are seen only in floating wind turbines. The natural periods in surge and pitch are caused by rigid body motions.

The first peak occurs at frequencies of around 0.008 Hz and corresponds to the rigid body oscillations of the support structure that may be caused by the surge motion of the floating wind turbine coupled with the restoring effects of the mooring lines. In these oscillations the tower moves forwards and backwards horizontally but remains in an essentially vertical position. These surge motions may be caused by changes in wind speed which excite the natural surge frequency of a wind turbine and may be more likely to occur in calmer waters.

The second peak occurs at frequencies of about 0.03 to 0.04 Hz and may correspond to the rigid body pitch oscillations of the support structure (i.e. the "nodding" back and forth of the support structure about a horizontal axis perpendicular to the turbine axis). When blade pitch is controlled in order to produce a constant power output, the size of this peak (i.e. the size of or energy in these oscillations) may increase dramatically due to the negative damping effect previously described, resulting in large structural stresses on the tower as well as oscillations in the power output.

The third, quite broad, peak occurs at frequencies of about 0.05 to 0.15 Hz. This corresponds to the rigid body wave-induced motion (surge coupled with pitch, but mostly pitch) of the floating wind turbine. The size of this peak may be minimised by modifying the geometry and weight distribution of the floating wind turbine.

The fourth peak occurs at frequencies of about 0.3 to 0.5 Hz. As mentioned above, these oscillations are present in both floating and fixed-base wind turbines and correspond to the structural bending vibrations of the support structure.

As mentioned above, in order to prevent or minimise the negative damping of the structural bending vibrations, the bandwidth of the blade pitch controller may be reduced such that it does not adjust the blade pitch for motions that occur at these frequencies (i.e. 0.3 to 0.5 Hz).

However, in a floating wind turbine, whilst this approach can still be applied to address bending vibrations, if the bandwidth of the blade pitch controller were reduced even further such that the controller did not adjust the blade pitch for motions that occur at frequencies of those of the rigid body oscillations of the tower in pitch (e.g. 0.03 to 0.04 Hz), this would significantly reduce the bandwidth of the controller and could result in unacceptable performance with respect to key wind turbine properties such as power production, rotor speed and rotor thrust force. Therefore, in order to avoid or reduce negative damping in a floating wind turbine installation, it is not practicable to simply reduce the bandwidth of the controller in this way.

Most modern multi-megawatt wind turbines use a proportional integral (PI) controller to control the blade pitch to produce a constant rotor speed when operating above the rated wind speed of the turbine. The PI controller is a feedback controller which controls the blade pitch and thereby the rotor speed (i.e. the rotational frequency of the rotor) on the basis of a weighted sum of the error (the difference between the output/actual rotor speed and the desired/target rotor speed) and the integral of that value. When the blade pitch control system is operating above rated power, the generator torque is typically controlled to produce either a constant torque or a constant power.

WO 2010/076557 describes a turbine controller which is designed to counteract the problem of negative damping, which occurs above rated wind speed, and to reduce resonant low frequency motion in the axial direction, specifically in relation to pitch motions in a floating wind turbine. This is achieved by collectively adjusting the pitch of the blades to create a damping and/or restoring force in the axial direction.

WO 2014/096419 describes a controller for controlling the yawing motion of the turbines that may be caused by uneven air flow over the rotor-disk. This is achieved by dynamic pitching of turbine blades, meaning that the pitch of individual turbine blades may be adjusted to bring yawing motion to within a desired range.

Known controllers are typically aimed at avoiding negative damping for certain motions made by floating wind turbines and may provide some amount of positive damping to the pitch motion of floating wind turbines.

An example of a control system 1 with a vibration controller with active damping for a fixed-base wind turbine is shown in FIG. 3. The upper line in FIG. 3 is the active vibration controller part 2 of the control system, which uses measurements of the tower velocity $v_{nacelle}$ to prevent or minimise negative damping, as described above. The rest of the system is the standard controller 4 which provides blade pitch control based on the rotor speed.

In FIG. 3, $v_{nacelle}$, is the speed of the nacelle, $K_d$ is the vibration controller gain, $\omega_{ref0}$ is the desired/target speed wind turbine rotor speed, $\omega_r$ is the actual wind turbine rotor speed, and $h_c(s)$ is a transfer function for converting the rotor speed error signal ($\omega_{ref0}-\omega_r$) to a first blade pitch reference signal $\beta_{ref1}$. The active vibration controller part 2 outputs a second blade pitch reference signal $\beta_{ref2}$. $h_p(s)$ is the transfer function between the total blade pitch reference signal $\beta_{ref}$ (where $\beta_{ref}=\beta_{ref1}+\beta_{ref2}$) and the actual wind turbine rotor speed $\omega_r$. The term "rotor speed error" in this case means the difference between a desired rotor speed (i.e. target rotor speed) and an actual rotor speed.

In general, a transfer function gives the ratio between Laplace transforms of the output and the input to a system component as a function of a variable s (where s is usually related to a spatial or temporal frequency, such as angular frequency). That is to say, transfer functions enable analysis of components such that they may be represented in block diagrams or other simplified diagrams. The background mathematics for this kind of function is known and is discussed for example in WO 2010/076557.

The transfer function $h_c(s)$ may be provided by means of a PI controller. The values of the parameters of the controller may be determined by conventional tuning of the control system to the desired bandwidth.

The signal processing block 6 in FIG. 3 will typically consist of some suitable filtering for removal of certain frequency components.

As noted above, in fixed-base wind turbines, the control parameters of the blade pitch controller are tuned such that the bandwidth of the standard part of the controller lies below the natural frequency of the first bending mode of the tower, in order to prevent or minimise negative damping of the structural bending oscillations.

In addition, a vibration control part such as the one shown in FIG. 3 may be provided to provide active positive damping for vibrations with frequencies of the first bending mode since these vibrations may have a frequency that is not suppressed by this part of the controller.

Also as mentioned above, floating wind turbines may also have structural bending vibrations with natural frequencies around 0.3 to 1 Hz. However, they also have rigid body oscillations with frequencies for example around 0.03 to 0.04 Hz and/or around 0.008 Hz.

If the control system in FIG. 3 were used in a floating wind turbine and the blade pitch controller parameters were tuned according to the frequency of the first structural bending mode of the tower, the active damping contribution would provide positive damping of the high-frequency structural bending vibrations. However, the active damping would not affect the lower frequency vibrations. Moreover, these frequencies would be within the bandwidth of the standard controller so the low-frequency rigid body oscillations of the support structure in pitch may suffer from negative damping.

The controller of FIG. 3 cannot simply be tuned to act on the lower frequency oscillations experienced by floating wind turbines.

The blade pitch controllers for floating wind turbines may be a modification of the standard blade pitch controller of FIG. 3 and may comprise active damping means arranged to further control the blade pitch on the basis of a speed of a point on the wind turbine structure. The active damping means may be arranged to convert the speed of a point on the wind turbine structure into a rotor speed error and the same transfer function that is used in the standard blade pitch control means is used in the active damping means in order to convert the rotor speed error into a correction to the blade pitch. This is disclosed in WO 2010/076557.

There is a desire for a controller that can effectively damp the motions of a floating wind turbine.

SUMMARY OF THE INVENTION

Viewed from a first aspect, the present invention provides a controller (i.e. a blade pitch controller and/or a generator torque controller) for a floating wind turbine comprising a rotor with a plurality of rotor blades connected to a generator, wherein the controller comprises: an active damping controller for calculating one or more outputs for damping both a first motion of the floating wind turbine in a first frequency range and a second motion of the floating wind turbine in a second frequency range based on an input of the first motion and an input of the second motion; wherein the controller is arranged to calculate an output for controlling a blade pitch of one or more of the plurality of rotor blades and/or for controlling a torque of the generator based on an actual rotor speed, a target rotor speed, and the one or more outputs from the active damping controller such that both the first motion and the second motion will be damped.

Viewed from a second aspect, the invention provides a floating wind turbine comprising a rotor with a plurality of rotor blades connected to a generator and a controller, wherein the controller comprises: an active damping controller for calculating one or more outputs for damping both a first motion of the floating wind turbine in a first frequency range and a second motion of the floating wind turbine in a second frequency range based on an input of the first motion and an input of the second motion; wherein the controller is arranged to calculate an output for controlling a blade pitch of one or more of the plurality of rotor blades and/or for controlling a torque of the generator based on an actual rotor speed, a target rotor speed, and the one or more outputs from the active damping controller such that both the first motion and the second motion will be damped.

The floating wind turbine of the second aspect may comprise a controller in accordance with the first aspect.

Viewed from a third aspect the invention provides a method of controlling the blade pitch and/or the generator torque of a floating wind turbine, wherein the floating wind turbine comprises a rotor with a plurality of rotor blades connected to a generator, the method comprising: receiving an input of a first motion of the floating wind turbine in a first frequency range; receiving an input of a second motion of the floating wind turbine in a second frequency range; calculating one or more damping outputs for damping both the first motion and the second motion based on the input of the first motion and the input of the second motion; and calculating an output for controlling a blade pitch of one or more of the plurality of rotor blades and/or for controlling the generator torque based on an actual rotor speed, a target rotor speed, and the one or more damping outputs such that both the first motion and the second motion will be damped.

The method of the third aspect may be performed using the controller of the first aspect and/or the floating wind turbine of the second aspect.

The controller of the first aspect and/or the floating wind turbine of the second aspect may be configured to perform the method of the third aspect.

Viewed from a fourth aspect the invention provides a computer program product comprising instructions that, when executed on processing circuitry for a floating wind turbine, will configure the processing circuitry to control a blade pitch for one or more rotors of the floating wind turbine and/or to control the generator torque of the floating wind turbine, the instructions comprising: receiving an input of a first motion of the floating wind turbine in a first frequency range; receiving an input of a second motion of the floating wind turbine in a second frequency range; calculating one or more damping outputs for damping both the first motion and the second motion based on the input of the first motion and the input of the second motion; and calculating an output for controlling a blade pitch of one or more of the plurality of rotor blades based on an actual rotor speed, a target rotor speed, and the one or more damping outputs such that both the first motion and the second motion will be damped.

The computer program product of the fourth aspect may be provided in the controller of the first aspect and/or the floating wind turbine of the second aspect. The computer program product of the fourth aspect may be used to perform the method of the third aspect. In other words, the computer program product may comprise instructions that, when executed on processing circuitry for a floating wind turbine, will configure the processing circuitry to perform the method of the third aspect.

The following describes optional features that may be combined with one, or more or all of the aspects of the invention.

The present invention allows for the effective damping of motions of different frequencies. This is achieved by receiving both an input of a first motion in a first frequency range and an input of a second motion in a second frequency range such that one or more outputs for damping both the higher and lower frequency motions can be calculated. The motions may be rigid body motions.

Existing active damping controllers for wind turbines are typically directed to the damping of floating wind turbine motions having a period of below about 50 seconds (about 0.02 Hz). The natural period of pitch motions typically occur in the range of about 25 to 50 seconds, which is significantly faster or slower than the period of other motions experienced by a floating wind turbine, such as surge motions. The period of surge motions for example may be about 60 seconds, or be even longer at around 2 or 3 minutes. These surge motions may be caused by changes in wind speed which excite the natural surge frequency of a wind turbine and may be more likely to occur in calmer waters.

The present invention may allow effective damping of motion at multiple frequencies, such as the pitch motion (which is the motion damped by typical blade pitch controllers) and the lower frequency surge motion of floating wind turbines. Thus the controller may for example be able to effectively damp motions, such as pitch motion and surge motion, of floating wind turbines which occur in different frequency ranges.

The controller is for controlling (i.e. damping) motions of the floating wind turbine. Thus the controller may be referred to as a motion controller and/or a floating wind turbine motion controller.

The controller is for calculating an output for controlling a blade pitch of one or more of the plurality of rotor blades and/or for controlling the torque of the generator, thus the controller may be referred to as a blade pitch controller and/or a generator torque controller.

The first motion may be a rigid body motion and/or the second motion may be a rigid body motion. The motions may be axial motions, e.g. pitch and surge motions. The first motion may be pitch and/or surge motions in the first frequency range and the second motion may be pitch and/or surge motions in the second (e.g. lower) frequency range.

The controller may be useful for floating wind turbines in locations with a mild wave climate. This is because in these locations wind induced loads may dominate overall mooring loads and the mooring loads may be caused by motions at a frequency different to other significant motions that are desired to be damped. Thus the present invention may for example allow the reduction of excessive loads on a mooring system of the floating wind turbine, thereby extending the lifetime of the mooring system in addition to reducing loads on the wind turbine structure itself. The first motion and/or the second motion may be axial motions, i.e. pitch and/or surge.

The first motion may be, or comprise, pitch motion and/or surge motion. The first frequency range may be about 0.02 to 0.05 Hz, or optionally within the range of about 0.03 to 0.04 Hz. This frequency range may pertain to any motions (or axial motions) of the floating wind turbine that have a natural or driven frequency within this range.

The motions of the floating wind turbine that occur within these ranges may be dominated by pitch motions, but may also include other types of motions.

The first motion may have a period less than about 50 seconds.

The second motion may be, or comprise, surge motion, e.g. low frequency surge motion.

Both the first motion and the second motion may comprise surge motion, but at different frequencies.

The second frequency range may be about 0.006 to 0.010 Hz, or optionally within the range of about 0.007 to 0.009 Hz. This frequency range may pertain to any motions (or axial motions) of the floating wind turbine that have a natural or driven frequency within this range. The motions of the floating wind turbine that occur within these ranges may be dominated by surge motions, but may also include other types of motions.

The second motion may have a period greater than about 60 seconds, such as about 2 to 3 minutes.

The first frequency range may be a range of frequencies higher than the range of frequencies of the second frequency range. The first frequency range and the second frequency range may be different and/or non-overlapping.

The input of the first motion and/or the input of the second motion may be a velocity. Thus the one or more outputs for damping both the first motion and the second motion may be based on the velocity of the first motion and a velocity of the second motion. The velocity may be a measured or estimated velocity.

The input of the first motion and/or the input of the second motion may each be a rigid body velocity measurement or estimate. These may be rigid body velocity measurement or estimates from different frequency ranges.

The velocity measurement or estimate of the first motion and/or second motion could be an estimate based on a motion, velocity and/or acceleration measurement.

The input of the first motion may be (or comprise) a measured or estimated wind turbine pitch velocity.

The input of the second motion may be (or comprise) a measured or estimated wind turbine surge velocity.

The active damping controller may be arranged to receive the input of the first motion and/or the input of the second motion.

The input of the first motion and/or the input of the second motion may be measured and/or estimated using the output from one or more sensors.

The input of the first motion may be measured and/or estimated using the output from a first sensor. The first sensor may be configured to provide an output indicative of motions in the first frequency range.

The input of the second motion may be measured and/or estimated using the output from a second sensor. The second sensor may be configured to provide an output indicative of motions in the second frequency range.

The input of the first motion and the input of the second motion may be measured and/or estimated using the output from different sensors.

This is because different sensors may have different filtering and/or control parameters that make the sensor more suited and/or required to obtain measurements of motions in different frequency ranges. Additionally or alternatively, the first and second sensors may be different types of sensors.

The input of the first motion may be obtained from the output from a motion sensor (e.g. velocity sensor and/or accelerometer etc.), i.e. the first sensor may be a motion sensor. The first sensor may be a motion reference unit (MRU). The first sensor may be for measuring rigid body motions (e.g. axial rigid body motions such as pitch and/or surge) in the first frequency range.

The output from the first sensor may be filtered so that it only measures motions with a frequency within the first frequency range.

The output from the second sensor may be filtered so that it only measures motions with a frequency within the second frequency range.

The motion sensor for detecting motion of the wind turbine may be positioned at any point on the wind turbine. For example, the sensor may be placed at the base of the wind turbine tower, in the nacelle of the wind turbine, or at any point along the wind turbine tower. The motion sensor may be configured to measure pitch motions of the wind turbine, e.g. pitch motions in the first frequency range.

The input of the second motion may be obtained from the output from a global positioning system (GPS) such as a differential global positioning system (DGPS), i.e. the second sensor may be a GPS (or a DGPS). The global positioning system may be used to measure the surge motions of the wind turbine, e.g. surge motions in the second frequency range.

Any other appropriate sensing means may be used to measure the pitch and surge motions individually, separately or simultaneously.

The controller may comprise a signal processing unit. The signal processing unit may be configured to take raw measurements from the sensors and apply one or more estimation techniques to estimate the velocity of the first motion and/or the second motion of the wind turbine. The estimation techniques may comprise Kalman filtering. For example, a measurement from a differential global positioning system may be combined with estimation techniques, such as Kalman filtering, to estimate the second motion, e.g. surge velocity.

The controller may comprise a low pass filter. The low pass filter may be configured to filter out changes in the speed of a point on the structure with frequencies above the natural frequency of the rigid body oscillations due to pitch. The filter may be a second or third order Butterworth low pass filter. Such filters may be configured to ensure that only oscillations with the desired frequencies are actively damped and do not produce too much variation in rotor speed.

The active damping controller/method may be for providing active damping control of the first motion (e.g. pitch motion of the floating wind turbine) and for providing active damping control of the second motion (e.g. surge motion of the floating wind turbine).

The active damping control of the second motion (e.g. surge motion of the floating wind turbine) may be for reducing loads on the mooring system.

The active damping controller may comprise two control loops, i.e. a first control loop and a second control loop. The two control loops may be independent.

The first control loop may be for providing active damping control of the first motion (e.g. pitch motion of the floating wind turbine).

The second control loop may be for providing active damping control of the second motion (e.g. surge motion of the floating wind turbine).

The first control loop and the second control loop may include different filtering and/or different parameter settings. This may mean that each control loop is tailored and/or optimised for the respective motions.

The first control loop may receive the input of the first motion, e.g. an input from a motion sensor provided on the floating wind turbine structure.

The second control loop may receive the input of the second motion, e.g. an input from or based on data from a differential global positioning system.

The first control loop may be for calculating an output for damping the first motion and the second control loop may be for calculating an output for damping the second motion.

The output for damping the first motion and/or second motion may be one or more of a rotor speed reference signal, a blade pitch adjustment and/or a generator torque adjustment.

The active damping controller may be configured to calculate a rotor speed reference signal, a blade pitch adjustment and/or a generator torque adjustment based on a motion of the floating wind turbine in a first frequency range and/or based on a motion of the floating wind turbine in a second frequency range.

The active damping controller may be configured to calculate a first rotor speed reference signal, a first blade pitch adjustment and/or a first generator torque adjustment based on a motion of the floating wind turbine in a first frequency range, a second rotor speed reference signal, a second blade pitch adjustment and/or a second generator torque adjustment based on a motion of the floating wind turbine in a second frequency range and/or a combined rotor speed reference signal, a combined blade pitch adjustment and/or a combined generator torque adjustment based on a motion of the floating wind turbine in a first frequency range and a motion in a second frequency range.

The controller may be arranged to control a blade pitch of one or more of the plurality of rotor blades based on an actual rotor speed, a target rotor speed, and the output from the active damping controller which may comprise one or more of a first additional rotor speed reference signal, a first blade pitch adjustment, a second additional rotor speed reference signal, a second blade pitch adjustment, a combined additional rotor speed reference signal and/or a combined blade pitch adjustment.

The controller may be arranged to control a torque of the generator based on an actual rotor speed, a target rotor speed, and the output from the active damping controller which may comprise one or more of a first additional rotor speed reference signal, a first generator torque adjustment, a second additional rotor speed reference signal, a second generator torque adjustment, a combined additional rotor speed reference signal and/or a combined generator torque adjustment.

The controller may comprise a one or more converters. The converter may be, or comprise, a PI controller, a PID controller, a transfer function, a non-linear equation, some other function or some other conversion means for converting a rotor speed error into a blade pitch adjustment and/or a generator torque adjustment. The converter may be, or may be part of, a wind turbine control system.

The controller may comprise a standard controller in addition to the active damping controller. The standard controller may be for calculating the output for controlling a blade pitch of one or more of the plurality of rotor blades and/or for controlling a torque of the generator. The standard controller may be for receiving the one or more outputs from the active damping controller. The standard controller may also receive the actual rotor speed and the target rotor speed.

The output may be for controlling the pitch of the rotor blades collectively. Thus the controller may be for providing collective blade pitch control.

The actual rotor speed may be the speed that the rotor of the floating wind turbine is rotating.

The target rotor speed may be the optimum rotor speed for power output. The target rotor speed may be referred to as the desired rotor speed and/or the optimum rotor speed.

Below rated wind speed, the target rotor speed may be the optimum attainable rotor speed for the given wind speed. Above rated wind speed, the target rotor speed may be the maximum speed for power output in the scenario that the wind turbine is not moving.

The target rotor speed and first and second or combined rotor speed adjustment(s) to damp the first motion and the second motion may be combined to give a rotor speed reference. The actual rotor speed may be subtracted from the rotor speed reference to provide a rotor speed error. The rotor speed error (i.e. the difference between the actual rotor speed and the target rotor speed adjusted to damp the motions) may be converted to a blade pitch adjustment and/or a generator torque adjustment.

The blade pitch adjustment and/or generator torque adjustment may cause the actual rotor speed to change. This may be to reduce the difference between the actual rotor speed and the reference rotor speed so as to reduce the rotor speed error. The blade pitch adjustment and/or generator torque adjustment may be used to control the wind turbine so as to tend the rotor speed error to zero.

The blade pitch adjustment and/or generator torque adjustment may cause an optimum rotor speed whilst providing forces to damp the first and second motions and/or to prevent negative damping of the first and/or second motions.

The active damping controller may comprise a first control loop (i.e. a control law) that calculates a first additional rotor speed reference signal $\omega_{ref1}$ (which may be the output for damping the first motion). The additional rotor speed reference signal may be calculated based on the measured or estimated velocity of the first motion $\dot{x}_1$ a controller gain $K_1$ and a filter, e.g. $h_1(s)$.

The control law may be written on the form of $$\omega_{ref1} = h_1(s) K_1 \dot{x}_1$$

$h_1(s)$ may be a second order low pass filter. The filter may have a Laplace form. $h_1(s)$ may be as follows:

$$h_1(s) = \frac{\omega_c^2}{\omega_c^2 + \sqrt{2}\omega_c s + s^2}$$

$\omega_c$ may be the low pass filter frequency. $\omega_c$ may for example be:

$$\omega_c = \frac{2\pi}{20} \text{rad/s}$$

s may be the Laplace variable.

The active damping controller may comprise a second control loop (i.e. a control law) that calculates a second additional rotor speed reference signal $\omega_{ref2}$ (which may be the output for damping the second motion). The second additional rotor speed reference signal may be calculated based on the measured or estimated velocity of the second motion $\dot{x}_2$ a controller gain $K_2$ and a filter, e.g. $h_2(s)$.

The control law may be written in the form of $$\omega_{ref2} = h_2(s) K_2 \dot{x}_2$$

$h_2(s)$ may be a second order low pass filter. The filter may have a Laplace form. $h_2(s)$ may be as follows:

$$h_2(s) = \frac{\omega_c^2}{\omega_c^2 + \sqrt{2}\omega_c s + s^2}$$

$\omega_c$ may be the low pass filter frequency. $\omega_c$ may for example be:

$$\omega_c = \frac{2\pi}{100} \text{rad/s}$$

s may be the Laplace variable.

The controller gain and/or the low pass filter frequency may be different between the first and second control loops. This may allow the first control loop to be suitable for the first motion and the second control loop suitable for the second motion.

The low pass filter frequency for the first control loop and the second control loop may be set according to the first frequency range and the second frequency range respectively.

$\dot{x}_1$ and $\dot{x}_2$ may be measured and/or estimated using the output from different sensors (as discussed above).

$\omega_{ref1}$ and $\omega_{ref2}$ may be the outputs for damping both a first motion and the second motion (i.e. respectively). $\omega_{ref1}$ and $\omega_{ref2}$ may be combined to provide a combined additional rotor speed reference signal that is provided as an output for damping both the first motion and the second motion.

$\omega_{ref1}$ and $\omega_{ref2}$ may be converted (either separately or together) in the active damping controller or in the standard controller to a blade pitch adjustment and/or a generator torque adjustment.

$\omega_{ref1}$ and $\omega_{ref2}$ may be combined with the target rotor speed $\omega_{ref0}$ to provide a total rotor speed reference signal $\omega_{ref}$. In other words $$\omega_{ref} = \omega_{ref0} + \omega_{ref1} + \omega_{ref2}$$

The actual rotor speed $\omega_r$ may be taken from the total target rotor speed reference signal $\omega_{ref}$ to give a rotor speed error $\omega_{error}$. The rotor speed error $\omega_{error}$ may be used to calculate a blade pitch adjustment and/or a generator torque. Because it includes to $\omega_{ref1}$ and $\omega_{ref2}$, the blade pitch adjustment and/or generator torque may result in the first motion and the second motion being damped.

The controller may comprise a single converter (e.g. in the standard controller) for converting all of the rotor speed signals (e.g. once combined) to a blade pitch adjustment and/or a generator torque adjustment. Alternatively, the controller may comprise multiple converters for converting the rotor speed signals separately to blade pitch adjustments and/or a generator torque adjustments. The blade pitch adjustments and/or generator torque adjustments may be combined to provide a total blade pitch adjustment and/or a total generator torque adjustment that are used for controlling the floating wind turbine.

Above rated wind speed, the controller may be used to prevent negative damping of the first motion and/or the second motion.

The controller/method may be used to control the floating wind turbine when the wind is above rated wind speed.

The controller/method may provide additional active damping control of the second motion of the floating wind turbine in addition to providing active damping control of the first motion of the floating wind turbine (where the two motions are within different frequency ranges).

The controller/method may be able to damp motions in a first frequency range that may give rise to loads on the floating wind turbine structure and damp motions of in a second frequency range that may give rise to loads on the mooring system of the floating wind turbine structure. This may be particularly effective at locations with mild wave climate where wind induced loads (which may be mitigated with the blade pitch and/or generator torque control) dominate the overall mooring loads.

The floating wind turbine may be a spar buoy-type floating wind turbine. The floating wind turbine may be secured to the ocean floor through the use of a mooring system such as mooring lines and/or one or more articulated legs. Alternatively, the floating wind turbine may be a semi-submersible type floating wind turbine or any other kind of floating wind turbine.

The floating wind turbine may comprise the first sensor and/or the second sensor.

The invention may be an additional controller or additional software. This may be arranged to perform the method or at least part of the method. Software may be stored on a physical medium or on a cloud-based storage solution or on any other suitable medium.

The controller may be retrofit to an existing floating wind turbine. This may be achieved by providing the existing floating wind turbine with the additional input(s), the additional sensor(s) and/or additional or updated code/software.

The active damping controller may be code that is used to provide one or more outputs (such as rotor speed reference(s), blade pitch adjustment(s) and/or generator torque adjustment(s)) that can be used to damp the first motion and/or the second motion.

Whilst the controller/method is described in relation to damping a first motion of a first frequency range and a second motion of a second frequency range, the controller/method may be able to damp further motions in further frequency ranges. Thus, the invention may be for damping a plurality of motions of a respective plurality of frequency ranges. This may be achieved by providing separate control loops for each frequency range. Each control loop may comprise filtering or other parameters for the particular frequency range it is designed to damp the motions of. A separate input (optionally each from separate sensors) may be provided for each motion in a different frequency range.

BRIEF DESCRIPTION OF THE DRAWINGS

Certain embodiments will now be described by way of example only and with reference to the accompanying drawings in which.

DETAILED DESCRIPTION

Figure 1:
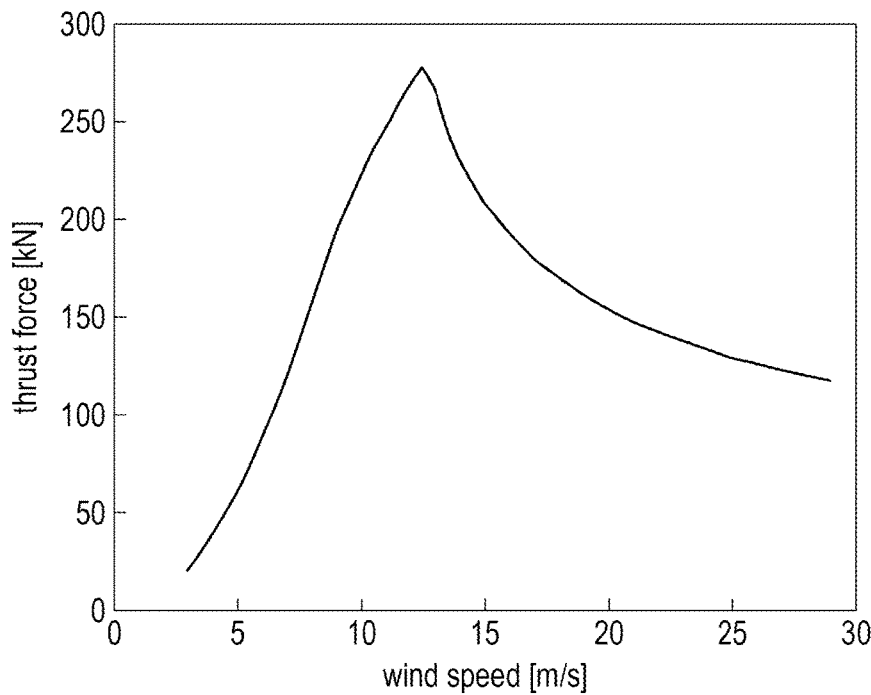
FIG. 1 is a graph of rotor thrust force as a function of wind speed for a 2.3 MW floating wind turbine using a conventional blade pitch control system.
Figure 2:
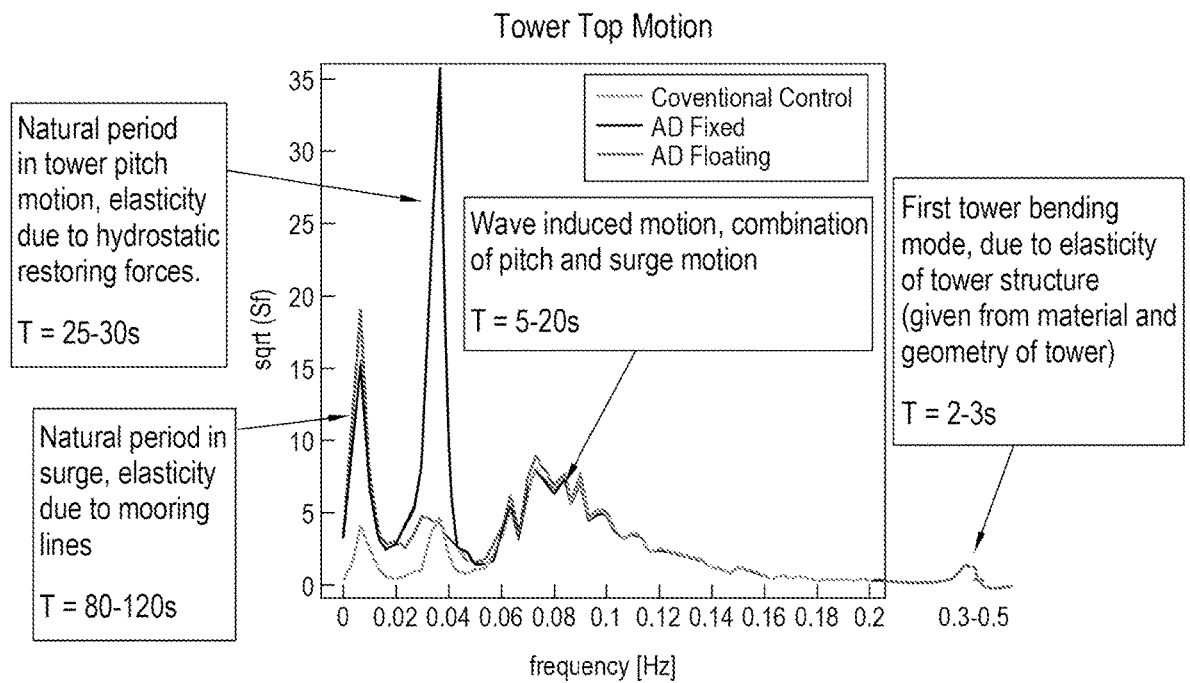
FIG. 2 is a typical power spectrum of oscillations in a floating wind turbine installation.
Figure 3:
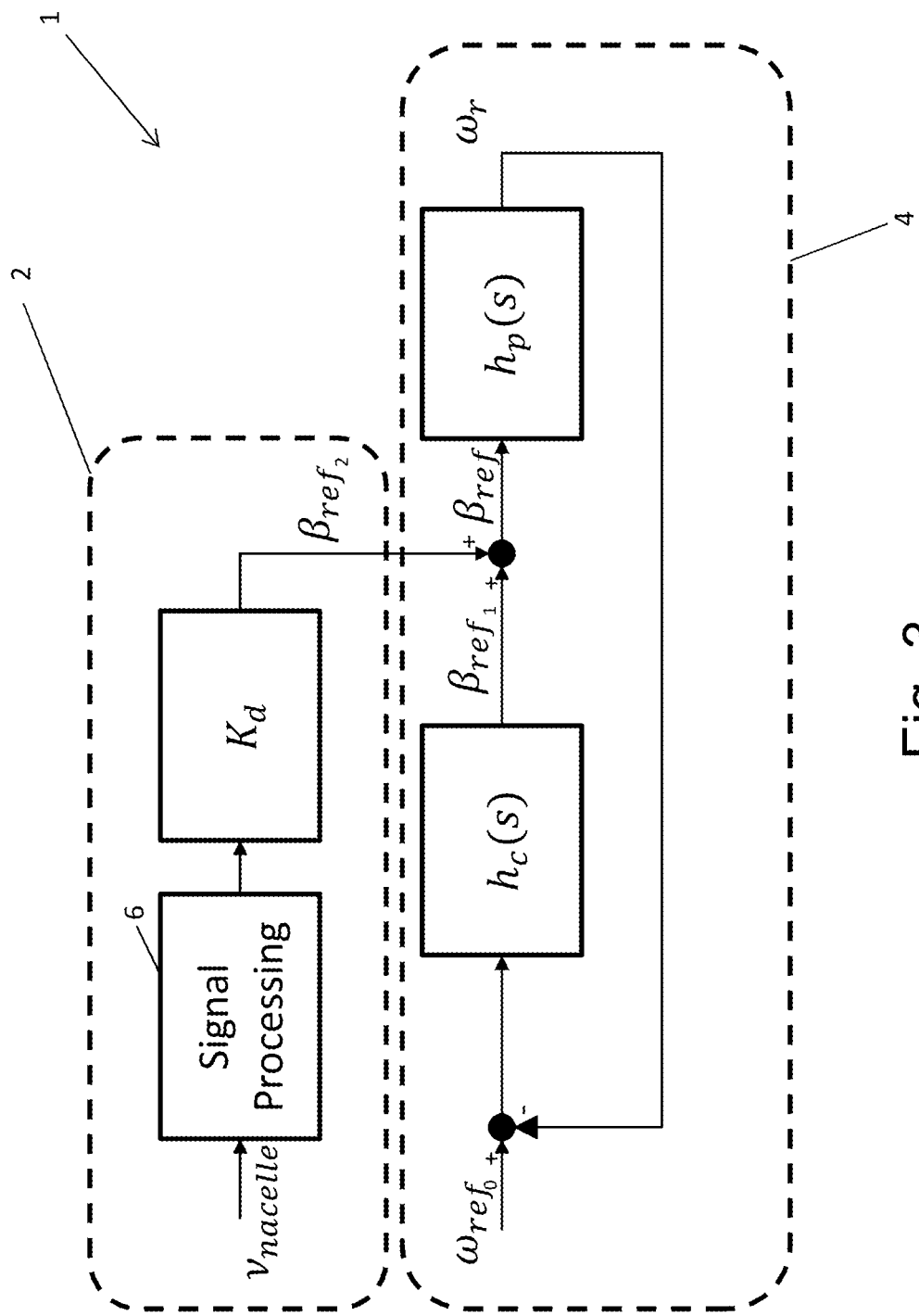
FIG. 3 is a schematic diagram of a blade pitch control system with vibration control for a fixed-base wind turbine.
Figure 4:
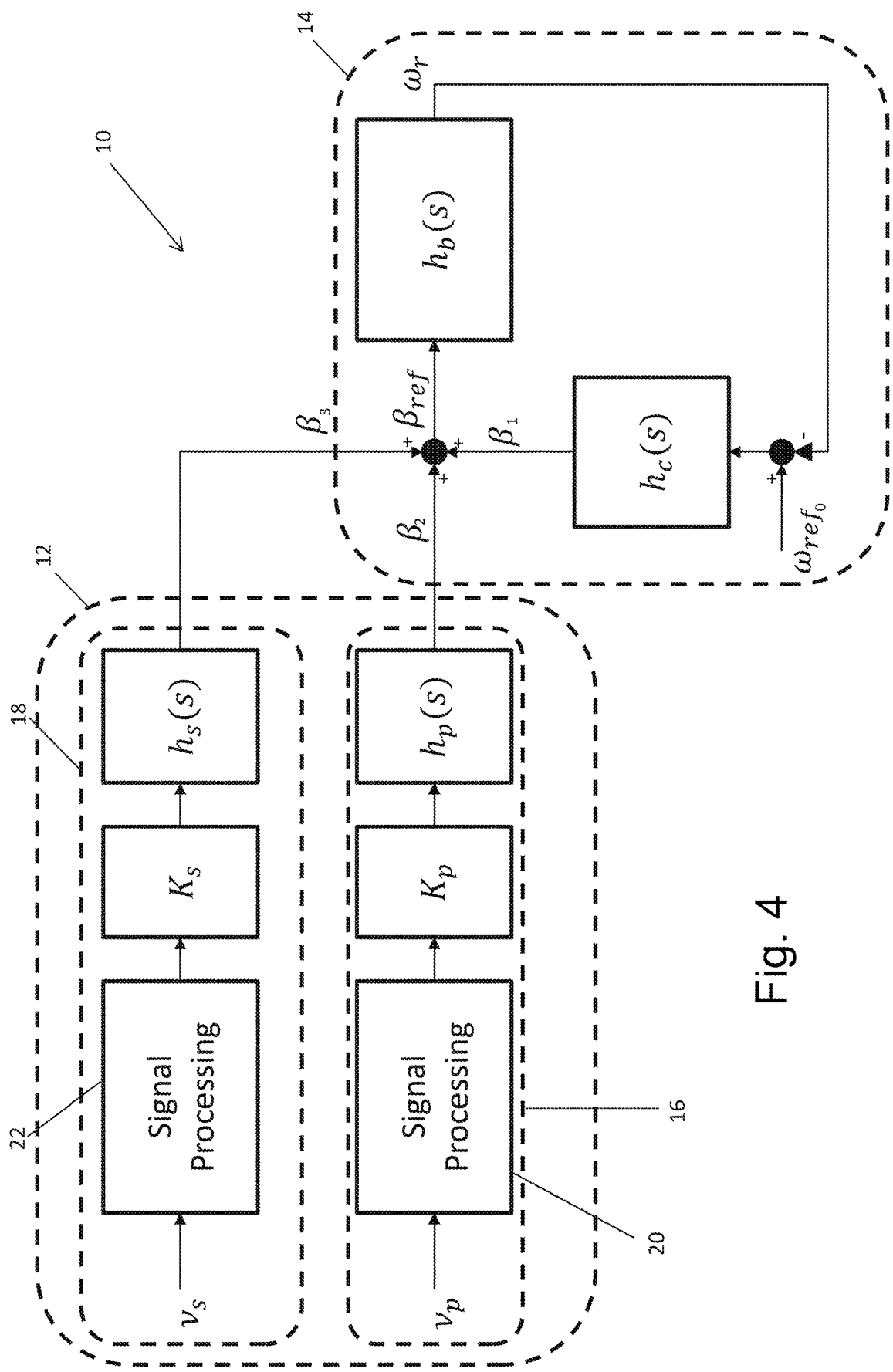
FIG. 4 is a block diagram of a controller for a floating wind turbine.

FIG. 4 illustrates a blade pitch controller 10 that can account for motions in different frequency ranges that may be experienced by a floating wind turbine. FIG. 4 illustrates a blade pitch controller that comprises an active damping controller 12 for calculating blade pitch adjustments $\beta_2$ and $\beta_3$ for damping a first motion (e.g. pitch and/or surge) in a first frequency range and a second motion (e.g. surge) in a second frequency range respectively. The active damping controller 12 is coupled to a standard blade pitch controller 14. The blade pitch controller 10 is operable in the manner described at or above rated wind speed.

The standard controller 14 subtracts an actual wind turbine rotor speed $\omega_r$ from a reference wind turbine rotor speed $\omega_{ref0}$. The reference rotor speed $\omega_{ref0}$ is a target rotor speed at which the wind turbine may be at its most efficient operation when the floating wind turbine is not moving. Therefore, the standard pitch control means 14 attempts to continuously correct the pitch of turbine rotor blades to bring the actual rotor speed $\omega_r$ as close to the target rotor speed $\omega_{ref0}$ as possible. The standard pitch control means 14 does not account for any motions of the wind turbine structure itself, however.

The active damping controller 12 in FIG. 4 comprises a first damping control loop 16 for calculating an output for damping rigid body motions of the wind turbine in a first frequency range (which may for example be, or comprise, pitch motions) and a second active damping control loop 18 for calculating a second output for damping rigid body motions of the wind turbine in a second frequency range (which may for example be, or comprise, surge motions).

In the first active damping control loop 16, a first measured or estimated velocity of the wind turbine $v_p$ (which may be referred to as $\dot{x}_1$) is processed by the first signal processing means 20 and then operated on by the first active controller gain $K_p$ and the first active damper controller transfer function $h_p(s)$, which produces a first additional blade pitch adjustment signal $\beta_2$. Similarly, in the second active damping control loop 18 a second measured or estimated velocity of the wind turbine $v_s$ (which may be referred to as $\dot{x}_2$) is processed by the second signal processing means 22 and then operated on by the second active controller gain $K_s$ and the second controller transfer function $h_s(s)$, which produces a second additional blade pitch adjustment signal $\beta_3$.

The first signal processing block 20 in the first damping control loop 16 for a floating turbine shown in FIG. 4 uses a sharp low pass filter with a filter frequency that is sufficiently below the wave frequency range (0.05 to 0.2 Hz) in order to avoid damping of wave induced motion, which would lead to bad performance with respect to key wind turbine parameters. The filter frequency may depend on the natural frequency in pitch of the floating wind turbine. It may be around 0.04 to 0.05 Hz.

The second signal processing block 22 in the second damping control loop 18 uses a similar sharp low pass filter with a filter frequency that is sufficiently below the first frequency range in order to minimise damping of motions in the first frequency range. The filter frequency may be around 0.01 to 0.02 Hz.

The value of the active damping gains will be tailored depending on the motions being damped. The exact value that is used for this parameter may be found by conventional controller tuning. Indeed, the first and second active damping gains $K_p$ and $K_s$ shown in FIG. 4 will also normally have different values to account for the different levels of damping that may be required for motions in the first and second frequency ranges.

Figure 5A:
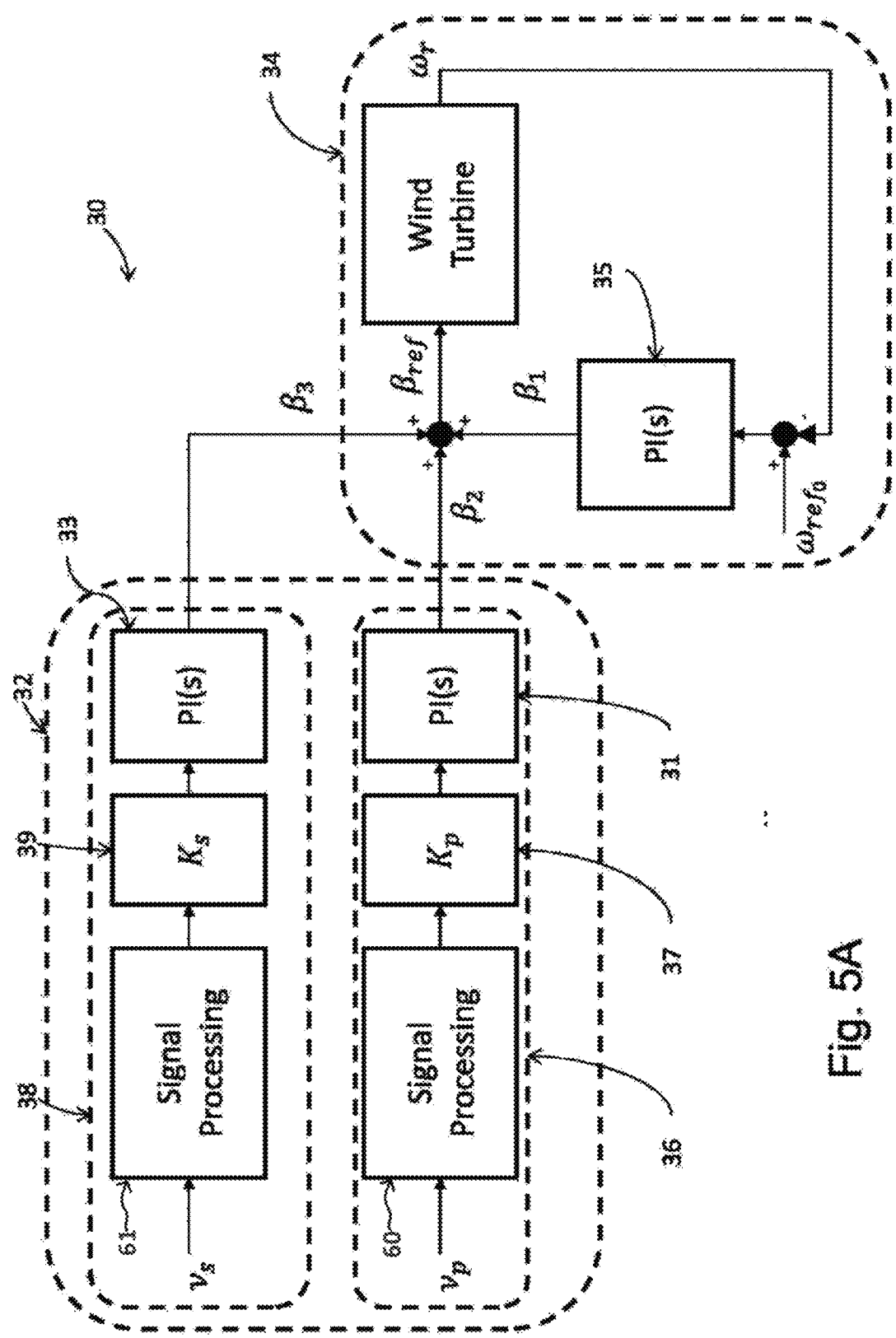
FIGS. 5A, 5B, and 5C are alternative controllers for a floating wind turbine.

FIG. 5A shows an example of a blade pitch controller 30 for a floating wind turbine using converters in the form of proportional integral (PI) controllers 31, 33 and 35. This blade pitch controller 30 also comprises a standard controller 34 and an active damping controller 32 similar to the controller 10 of FIG. 4.

This particular controller 30 uses a PI controller for each of the first and second damping control loops 36, 38 and a PI controller 35 for the standard blade pitch control means 34. Similarly to the controller of FIG. 4, the first damping control loop 36 uses a first active damping gain $K_p$, represented as a first active damping gain block 37, which operates on a signal 60 processed from the first measured or estimated velocity $v_p$ of the wind turbine before being operated on by a first PI controller 31. The first PI controller 31 comprises processing circuitry that is capable of converting an output from the first active damping gain block 37 in order to produce a first additional blade pitch adjustment $\beta_2$.

Similarly, the second damping control loop 38 uses a second active damping gain $K_s$, represented as a second active damping gain block 39, which operates on a signal 61 processed from the second measured or estimated velocity $v_s$ of the wind turbine before being operated on by a second PI controller 33. The second PI controller 38 comprises processing circuitry that is capable of converting an output from the second active damping gain block 39 in order to produce a second additional blade pitch adjustment $\beta_3$.

Figure 5B:
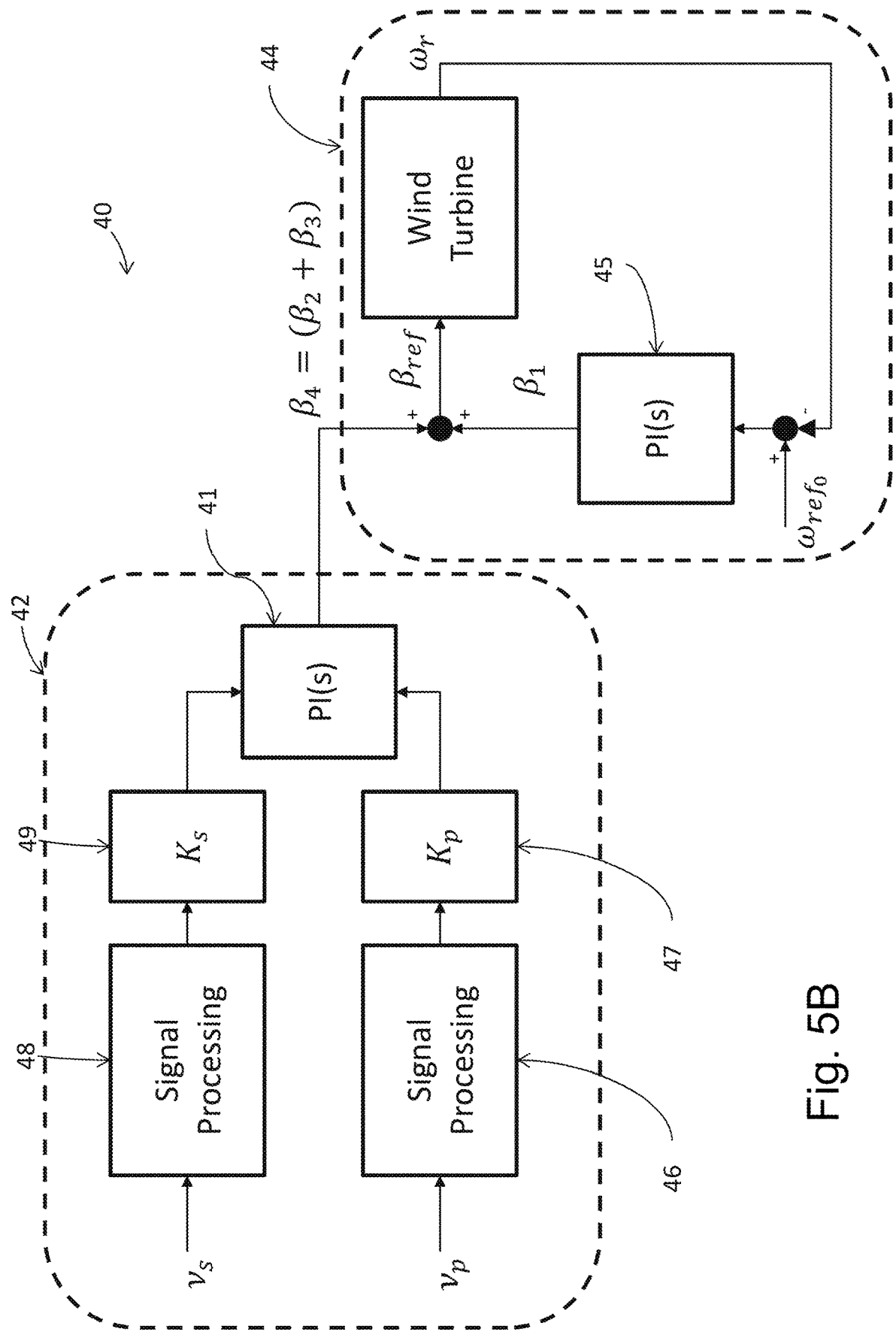

The additional blade pitch adjustments $\beta_2$ and $\beta_3$ are combined with the blade pitch adjustment $\beta_1$ from the standard controller 34 to provide a total blade pitch adjustment $\beta_{ref}$ that is used to control the wind turbine so as to damp the first and second motions and cause the rotor speed co, to tend towards the target rotor speed $\omega_{ref0}$. This is so as to reduce the forces on the wind turbine structure and mooring system whilst maximising power output for the given wind speed. The controller 30 is operable in the manner described at or above rated wind speed. An alternate controller 40 is shown in FIG. 5B. This is similar to the controller 30 shown in FIG. 5A except it uses a single PI controller 41 for the first and second control loops of the active damping controller 42 rather than two as shown in FIG. 5A. FIG. 5B shows a standard controller 44 and an active damping controller 42, wherein the active damping controller 42 comprises the single PI controller 41, a first and second signal processing blocks 46, 48 and a first and second active damping gain blocks 47, 49. The standard controller 44 is configured to combine the standard blade pitch adjustment $\beta_1$ with a combined additional blade pitch adjustment $\beta_4$, where the combined additional blade pitch adjustment $\beta_4$ is the sum of the first additional blade pitch adjustment $\beta_2$ and the second additional blade pitch adjustment $\beta_3$. The combination of the standard blade pitch adjustment and the combined additional blade pitch adjustment $\beta_4$ provides the total blade pitch adjustment $\beta_{ref}$. The alternate controller 40 is operable in the manner described at or above the rated wind speed.

Whilst the controllers 10, 30, and 40 of FIGS. 4, 5A, and 5B are illustrated as blade pitch controllers they may additionally or alternatively calculate a generator torque adjustment that can be used to control the wind turbine so as to tend the actual rotor speed $\omega_r$ towards the target rotor speed $\omega_{ref0}$ whilst damping the first and second motions. This can also have the effect of reducing the forces on the wind turbine structure and mooring system whilst maximising power output for the given wind speed.

Figure 5C:
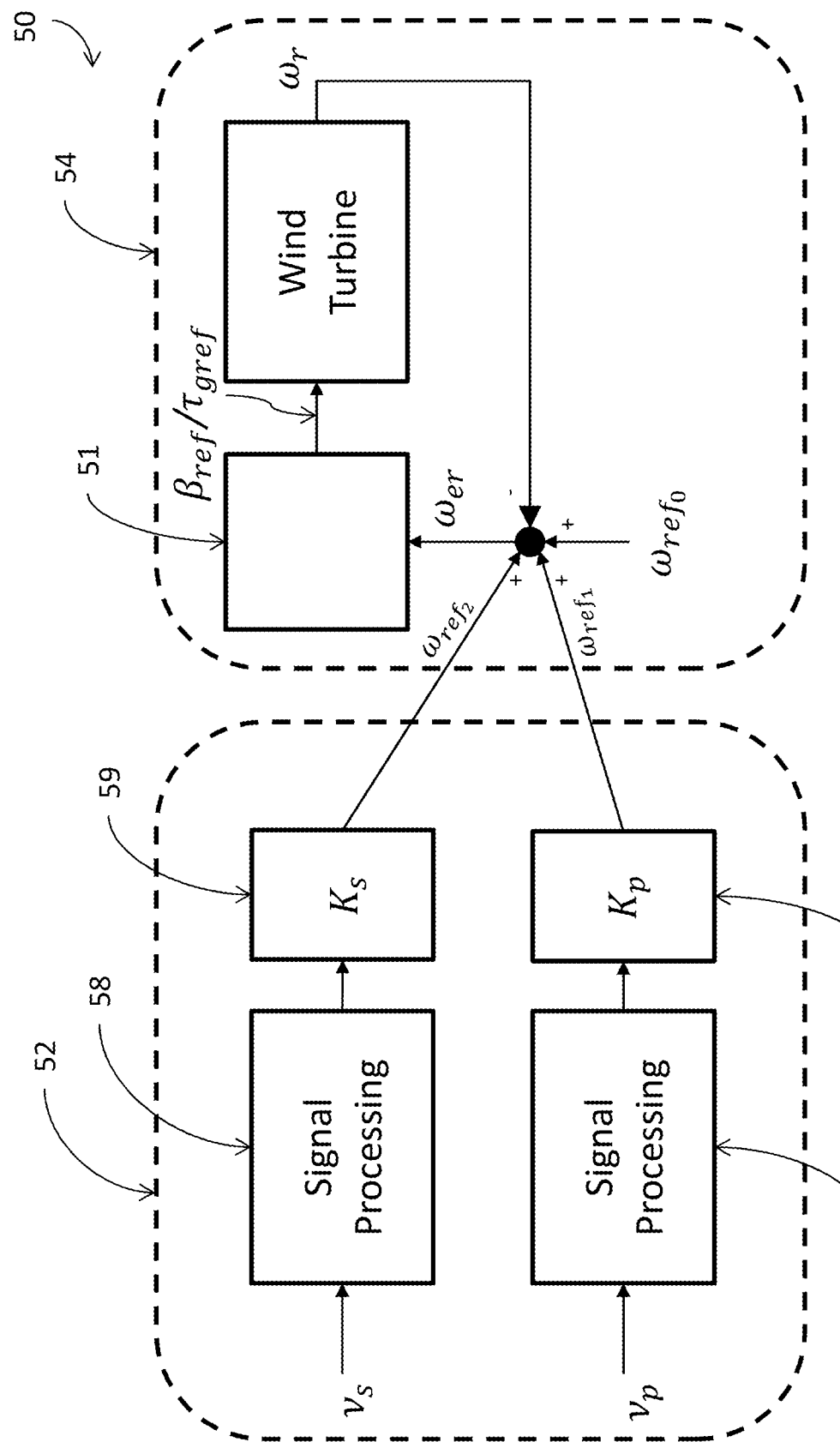

Another floating wind turbine controller 50 for damping a first motion and a second motion of different frequencies is shown in FIG. 5C. This also comprises a standard controller 54 and an active damping controller 52.

This controller 50 receives an input of the first motion $v_p$ (which may be a measured or estimated velocity of the wind turbine in a first frequency range) and processes this using the signal processing 56 and active damping gain $K_p$ 57 to convert it to a first additional rotor speed signal $\omega_{ref1}$. The controller 50 also receives an input of the second motion $v_s$ (which may be a measured or estimated velocity of the wind turbine in a second frequency range) and processes this using the signal processing 58 and active damping gain $K_s$ 59 to convert it to a second additional rotor speed signal to $\omega_{ref2}$. $\omega_{ref1}$ and $\omega_{ref2}$ are outputs that are for damping the first motion and the second motion respectively. The signal processing 56 and 58 may each be tailored to the frequency range of concern for that control loop. The controller 50 is operable in the manner described at or above the rated wind speed.

The additional rotor speed signals to $\omega_{ref1}$ and $\omega_{ref2}$ for damping the first and second motions are combined with the target rotor speed signal $\omega_{ref0}$ and the actual rotor speed $\omega_r$ is subtracted to provide a rotor speed error $\omega_{error}$. The rotor speed error $\omega_{error}$ is converted using the convertor 51 to a blade pitch adjustment signal $\beta_{ref}$ and/or a generator torque adjustment signal $\tau_{gref}$ that is/are for controlling the floating wind turbine. The convertor 51 may be any known means for converting a rotor speed signal to a blade pitch adjustment signal and/or generator torque signal such as a PI controller, a PID controller, a transfer function, a non-linear equation and/or some other wind turbine control system.

As with the other controllers 10, 30, and 40 of FIGS. 4, 5A, and 5B, the blade pitch adjustment signal $\beta_{ref}$ and/or the generator torque adjustment signal $\tau_{ref}$ can be used to control the wind turbine so as to tend the actual rotor speed $\omega_r$ towards the target rotor speed $\omega_{ref0}$, whilst also damping the first and second motions. This can lead to reducing the forces on the wind turbine structure and mooring system whilst maximising power output for the given wind speed.

The controller 50 of FIG. 5C uses one converter 51 with inputs from the active damping controller 52 and the standard controller 54.

The order in which contributions from each of the active damping controller and standard controller are added together or whether they have been processed by a PI controller (or some other converter) may vary between different implementations of the controller.

The common features between the various exemplary controllers for a floating wind turbine are that the controller comprises an active damping controller and a standard controller. The active damping controller receives an input of the first motion and a separate input of the second motion which have different frequencies. These motions may be rigid body motions, in particular axial motions such as pitch and/or surge. The inputs may be measurements and/or estimates of the velocity of the motions. The inputs may be based on the outputs from different sensors. For example, the velocity of a first, higher frequency motion may be based on the output from a motion sensor provided on the floating wind turbine. The velocity of a second, lower frequency motion may be based on the output from a differential global positioning system.

The active damping controller calculates one or more outputs (e.g. either two separate outputs or a combined output) that are for causing the damping of the first and second motions. The outputs may be one or more additional rotor speed signals, blade pitch adjustment signals and/or generator torque adjustment signals.

These outputs from the active damping controller are combined with the actual rotor speed and target rotor speed to provide an output for controlling the actual blade pitch and/or generator torque of the floating wind turbine. This output is for effectively damping the first motion and the second motion. This can reduce loads on both the wind turbine structure and the mooring structure which may be caused by the different types of motion of different frequencies.

Because separate control loops and/or inputs are provided in respect of the first motion and the second motion of different frequencies they can be tailored to the different frequencies so that effective damping of both types of motions can be achieved.

Figure 6:
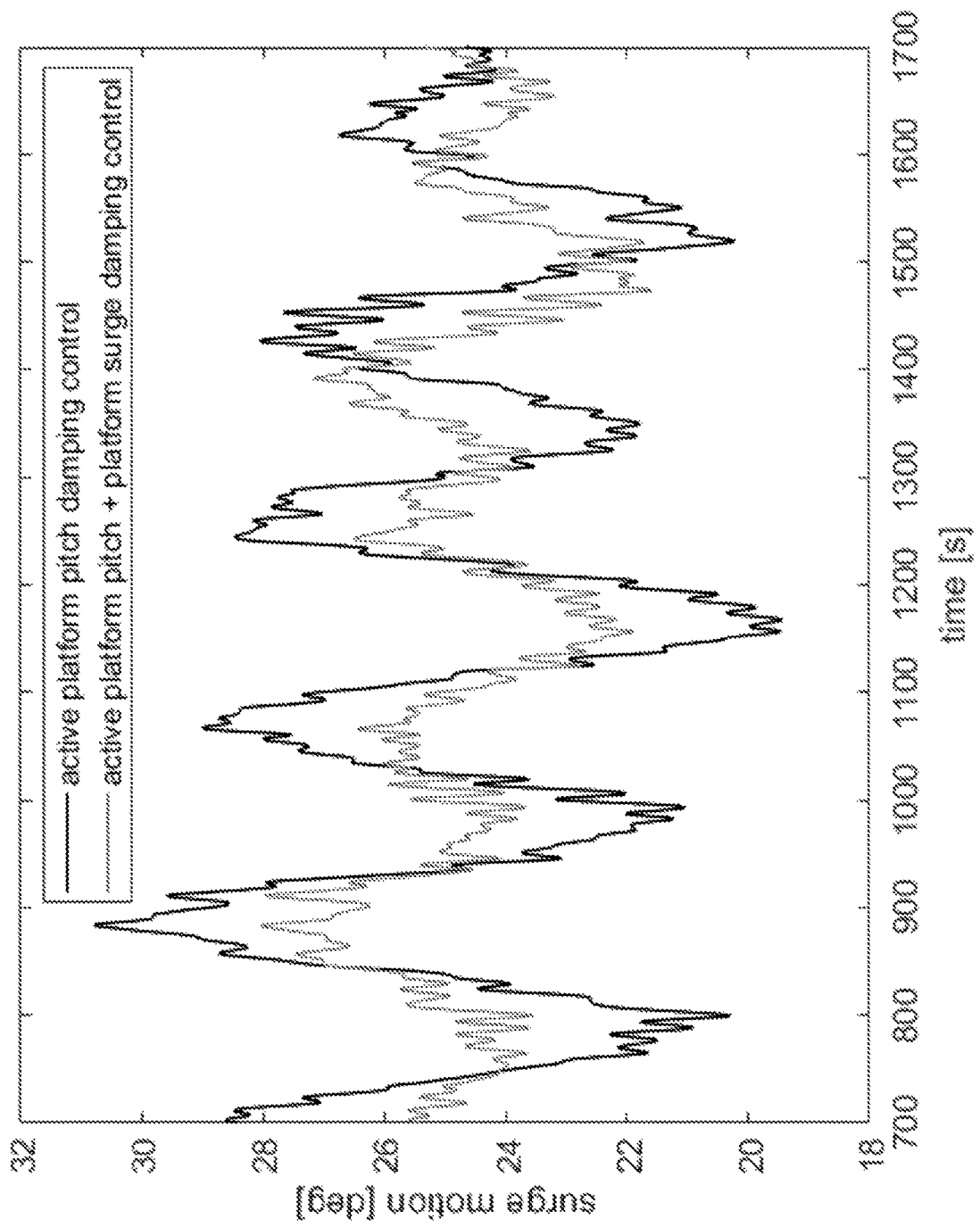
FIGS. 6 and 7 are graphs showing results from a simulation comparing a floating wind turbine with a controller that accounted for motions within a first frequency range only with a floating wind turbine with a controller that accounted for motions in a first frequency range and motions in a second frequency range.
Figure 7:
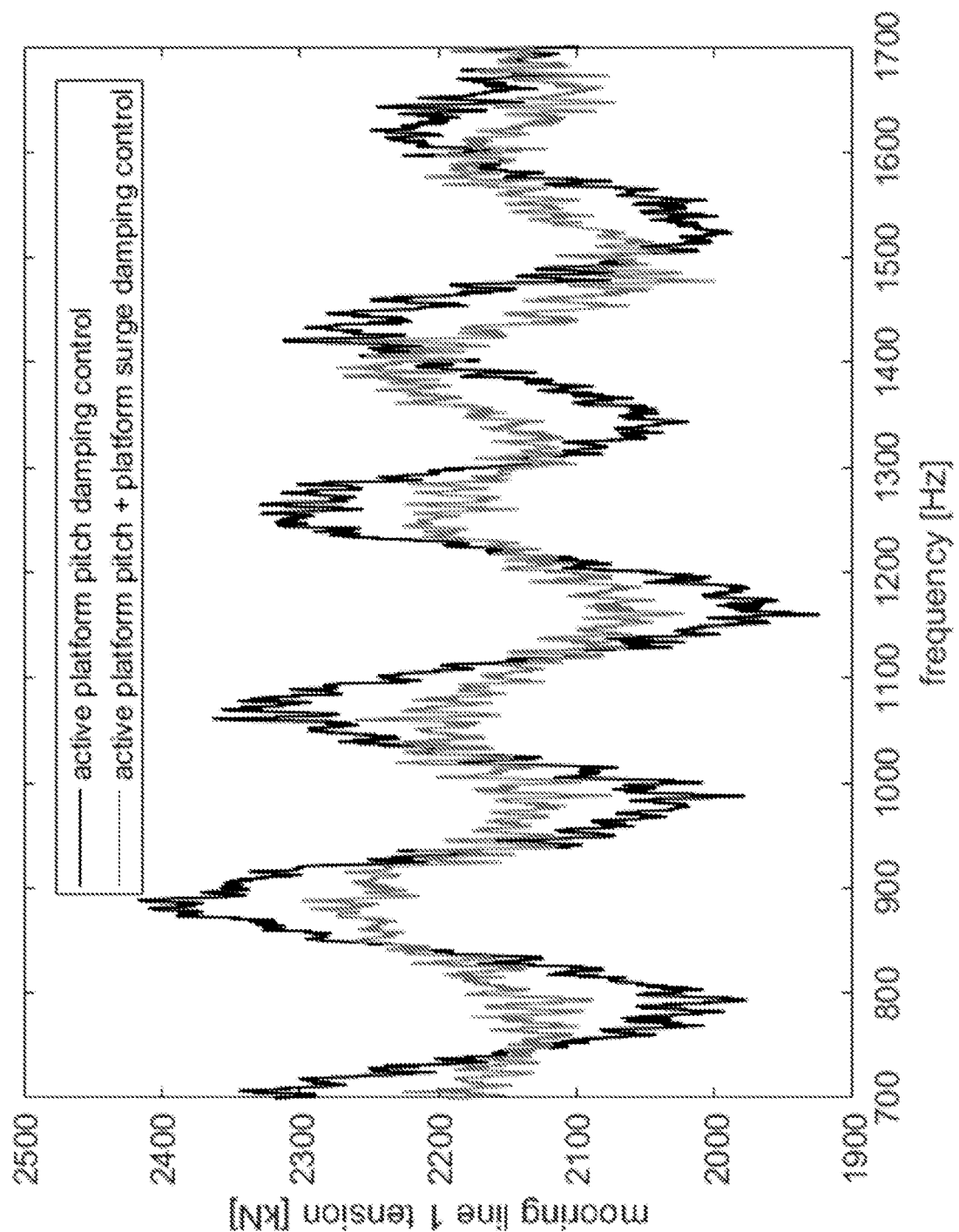

FIGS. 6 and 7 show the results of a simulation to help illustrate the benefits of wind turbine control that accounts for motions of different frequencies. FIG. 6 shows the surge motions for a floating wind turbine with a known controller and with a controller that accounts for motions of two different frequencies (in this case higher frequency pitch motions and lower frequency surge motions). FIG. 7 shows the mooring line tension in the highest loaded mooring line from the same simulation. The simulation compares scenarios where the floating wind turbine uses a blade pitch controller with active damping for pitch motions only with a floating wind turbine having a controller with active damping for higher frequency pitch motions and lower frequency surge motions.

In this simulation, an 8 MW spar buoy-type floating wind turbine with three mooring lines was modelled. FIGS. 6 and 7 depict a snapshot of the simulation between 700 and 1700 seconds, where the total length of the simulation was 2700 seconds. Parameters of the simulation included that the mean wind speed was 14 $ms^{-1}$, there was a turbulence intensity of 8.9%, significant wave heights were set to 1.8 m, and the characteristic peak period was 13.8 s.

For the extent of the 2700 second simulation for this particular set of parameter values, it was found that the mooring line fatigue life is increased with a factor of 3.68 in the case of combined active damping for pitch motions and for surge motions (i.e. accounting for motions of two different frequency ranges), compared to that of active damping for pitch motions only (i.e. accounting for motions within one frequency range).

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

The invention claimed is:

1. A controller for a floating wind turbine comprising a rotor with a plurality of rotor blades connected to a generator, wherein the controller comprises:
an active damping controller for calculating one or more outputs for damping both a first motion of the floating wind turbine in a first frequency range and a second motion of the floating wind turbine in a second frequency range based on an input of the first motion and an input of the second motion, wherein the first motion comprises pitch and/or surge motions in the first frequency range and the second motion comprises pitch and/or surge motions in the second frequency range, wherein the pitch and/or surge motions are rigid body motions, and wherein the first frequency range is higher than the second frequency range;
wherein the active damping controller comprises a first control loop and a second control loop, wherein the first control loop receives the input of the first motion and the second control loop receives the input of the second motion; and
wherein the active damping controller comprises a low pass filter, wherein a first low pass filter frequency for the first control loop and a second low pass filter frequency for the second control loop is set according to the first frequency range and the second frequency range respectively;
wherein the controller is arranged to calculate an output for controlling a blade pitch of one or more of the plurality of rotor blades and/or for controlling a torque of the generator based on an actual rotor speed, a target rotor speed, and the one or more outputs from the active damping controller such that both the first motion and the second motion will be damped.

2. A controller according to claim 1, wherein the input of the first motion is a measured or estimated velocity of the first motion and the input of the second motion is a measured or estimated velocity of the second motion.

3. A controller according to claim 1, wherein the input of the first motion is measured and/or estimated using the output from a first sensor and the input of the second motion is measured and/or estimated using the output from a second sensor.

4. A controller according to claim 3, wherein the first sensor is a motion sensor and/or the second sensor is a global positioning sensor.

5. A controller according to claim 1, wherein the output for damping the first motion and/or second motion comprises one or more of an additional rotor speed reference signal, an additional blade pitch adjustment and/or an additional generator torque adjustment.

6. A controller according to claim 1, wherein the output for controlling a blade pitch of one or more of the plurality of rotor blades comprises a total blade pitch adjustment and/or wherein the output for controlling the torque of the generator comprises a total generator torque adjustment.

7. A method of controlling a blade pitch and/or a generator torque of a floating wind turbine, wherein the floating wind turbine comprises a rotor with a plurality of rotor blades, the method comprising:
receiving, in a first control loop, an input of a first motion of the floating wind turbine in a first frequency range, wherein a first low pass filter frequency for the first control loop is set according to the first frequency range;
receiving, in a second control loop, an input of a second motion of the floating wind turbine in a second frequency range, wherein a second low pass filter frequency for the second control loop is set according to the second frequency range;
calculating one or more damping outputs for damping both the first motion and the second motion based on the input of the first motion and the input of the second motion; and
calculating an output for controlling a blade pitch of one or more of the plurality of rotor blades and/or for controlling a torque of the generator based on an actual rotor speed, a target rotor speed, and the one or more damping outputs such that both the first motion and the second motion will be damped,
wherein the first motion comprises pitch and/or surge motions in the first frequency range and the second motion comprises pitch and/or surge motions in the second frequency range, wherein the pitch and/or surge motions are rigid body motions, and wherein the first frequency range is higher than the second frequency range.

8. A method according to claim 7, wherein the input of the first motion is a measured or estimated velocity of the first motion and the input of the second motion is a measured or estimated velocity of the second motion.

9. A method according to claim 7, wherein the input of the first motion is measured and/or estimated using the output from a first sensor and the input of the second motion is measured and/or estimated using the output from a second sensor.

10. A method according to claim 9, wherein the first sensor is a motion sensor and/or the second sensor is a global positioning sensor.

11. A method according to claim 7, wherein the one or more damping outputs comprise one or more of an additional rotor speed reference signal, an additional blade pitch adjustment and/or an additional generator torque adjustment.

12. A method according to claim 7, wherein the output for controlling a blade pitch of one or more of the plurality of rotor blades comprises a total blade pitch adjustment and/or wherein the output for controlling the torque of the generator comprises a total generator torque adjustment.

13. A non-transient computer program product comprising instructions that, when executed on processing circuitry for a floating wind turbine, will configure the processing circuitry to perform the method of claim 7.

14. A controller as claimed in claim 1, wherein the damping takes place at or above the rated wind speed.

15. A method as claimed in claim 7, wherein the damping takes place at or above the rated wind speed.

16. A non-transient computer program product as claimed in claim 13, wherein the damping takes place at or above the rated wind speed.

17. A controller according to claim 1, wherein the first low pass filter frequency is $2\pi/20$ rad/s and the second low pass frequency is $2\pi/100$ rad/s.

18. A method according to claim 7, wherein the first low pass filter frequency is $2\pi/20$ rad/s and the second low pass frequency is $2\pi/100$ rad/s.

19. A controller according to claim 1, wherein the first frequency range is about 0.02 to 0.05 Hz and the second frequency range is about 0.006 to 0.01 Hz.

20. A method according to claim 7, wherein the first frequency range is about 0.02 to 0.05 Hz and the second frequency range is about 0.006 to 0.01 Hz.

* * * * *